May 21, 1963 J. H. MORAN 3,090,910
SYSTEM FOR MEASURING BY INDUCTION THE CONDUCTIVITY OF A MEDIUM
Filed May 21, 1959 3 Sheets-Sheet 1

INVENTOR.
JAMES H. MORAN
BY Drumbaugh, Free,
Graves & Donohue
his ATTORNEYS

May 21, 1963 J. H. MORAN 3,090,910
SYSTEM FOR MEASURING BY INDUCTION THE CONDUCTIVITY OF A MEDIUM
Filed May 21, 1959 3 Sheets-Sheet 2

FIG. 3

WAVEFORMS (only one complete cycle shown)

INVENTOR.
JAMES H. MORAN
BY Brumbaugh, Free,
Graves & Donohue
his ATTORNEYS

May 21, 1963 J. H. MORAN 3,090,910
SYSTEM FOR MEASURING BY INDUCTION THE CONDUCTIVITY OF A MEDIUM
Filed May 21, 1959 3 Sheets-Sheet 3

INVENTOR.
JAMES H. MORAN
BY Brumbaugh, Free
Graves & Donohue
his ATTORNEYS

United States Patent Office 3,090,910
Patented May 21, 1963

3,090,910
SYSTEM FOR MEASURING BY INDUCTION THE CONDUCTIVITY OF A MEDIUM
James H. Moran, Danbury, Conn., assignor to Schlumberger Well Surveying Corporation, Houston, Tex., a corporation of Delaware
Filed May 21, 1959, Ser. No. 814,914
18 Claims. (Cl. 324—6)

This invention relates to systems which measure the conductivity of a medium in a region thereof by probing that region of the medium with a primary magnetic force field, and by obtaining an indication of electrical effects produced in such region of the medium by such field.

A system of this sort is comprised of the principal components of a magnetic field transmitter, a magnetic field receiver, and means to indicate a voltage effect or effects induced in the receiver. As a preliminary to a conductivity measurement of a particular region of a given medium, the transmitter is disposed to be in magnetic field coupled relation with such region. Likewise, the receiver is disposed to be in magnetic field coupled relation with such region at a location which is spaced from that of the transmitter. The transmitter is excited by current to produce a magnetic field which penetrates the medium and which pervades the region of interest. Electrical effects created in such region by this field will induce in the receiver a voltage having a characteristic which varies in accordance with the conductivity of the medium in that region.

In conventional practice, the conductivity measurement is carried out by exciting the transmitter with alternating current. This alternating current is converted by the transmitter into a magnetic field of like alternating character. As a consequence, the voltage induced in the receiver will be an alternating voltage. The component of this induced alternating voltage which is in phase with the current exciting the transmitter is a voltage component whose value varies with the conductivity of the medium. Accordingly, by measuring the value of this in-phase component, it is possible to obtain to a reasonable approximation the conductivity value of the medium in the field probed region thereof.

The practice just described is, however, characterized by certain disadvantages among which are the following. First, when the transmitter is excited by alternating current to thereby cause an alternating voltage to be induced in the receiver, the component of the induced voltage which is in 90° phase relation to the exciting current is a component which is generally many times larger than the desired component of the induced voltage which has an in-phase relation with the exciting current. Because of the large magnitude of this undesired 90° phase component as compared to the relatively small magnitude of the desired 0° phase component, it is often difficult in practice to separate the effect of the desired component from the effect of the extraneous component so as to obtain an indication which is exclusively a measure of the desired component.

Second, when alternating exciting current is used, there is often created in the medium a skin effect phenomenon which affects to a substantial degree the indicated value of conductivity which is actually obtained. This is disadvantageous since it may not be feasible or convenient to correct for the effect of the skin effect phenomenon on the indicated value of conductivity.

It is accordingly an object of this invention to provide conductivity measuring systems which are free of the above-noted disadvantages.

Another object of the invention is to provide conductivity measuring systems of the above-described character wherein the obtained indication of conductivity of a medium in a probed region is, to a first approximation, independent of the permeability of the medium in that region.

Yet another object of the invention is to provide conductivity measuring systems of the above-described character wherein, by the concentration of the utilized average power into intermittent periods of high peak power, the medium may be probed for conductivity throughout a greater regional expanse than would otherwise be possible.

These and other objects are realized according to the invention as follows. As one element of apparatus for carrying out the method of the invention, there is provided current waveform generating means adapted to produce at least one current variation having a ramp waveform. One sort of such ramp waveform current variation is represented by the uni-directional change in current from zero value to peak value which characterizes the initial, rising magnitude portion of a sawtooth current wave. Accordingly, the current waveform generating means may be a conventional current sawtooth generating circuit together with whatever control circuits are required in order for the sawtooth generating circuit to function.

It is the uni-directional change in current rather than the absolute value of current which is of operative effect in the invention. Accordingly, the current variations of ramp waveform need not be variations which start at zero current value. Furthermore, such current variations need not be in the direction of increasing current magnitude, but may be in the direction of decreasing current magnitude. Thus, for example, it is in accordance with the invention to employ as the mentioned current variation of ramp waveform a unidirectionally changing current which proceeds from an initial magnitude greater than zero towards a magnitude of zero. However, this last named type of current variation is not ordinarily as efficient in terms of the power required to produce the variation as is the preferred type of current variation wherein the unidirectionally changing current proceeds from an initial value towards a higher magnitude value.

It is evident that the described current variation of ramp waveform may be provided by shaped currents having an overall waveform which is other than a sawtooth. Thus, for example, either the leading edge or lagging edge of a trapezoidal wave can be used to provide the mentioned current variation. It also is evident that the current variation may be either negative going or positive going in respect to a reference direction of current flow.

While the invention extends to instances where a conductivity measurement is obtained by the use of only a single current variation of ramp waveform, it is preferable that the conductivity measurement be obtained as the result of the continuous periodic generation of a succession or "train" of such current variations. Such conductivity measurement will be more reliable than one which is based entirely on a single current variation. Also, as described hereinafter, the generation of successive current variations of ramp waveform permits the employment at the receiving end of the system of integrating means and methods which serve to reduce the ratio of received signal to noise.

The one or more current variations are employed to excite a magnetic field transmitter comprised of one or more inductors, i.e., coils, wires or like elements adapted to produce a magnetic field when energized by current. A form of transmitter suitable for many applications is a single, multi-turn coil, and the invention will hereinafter be described in terms of such single coil. The coil will respond to an exciting current variation of ramp waveform to generate a primary magnetic force field having a time varying field strength. The time variation of the strength of the field reproduces the time variation of the exciting current in that, at every instant of time, the ratio of the strength of such primary field to the strength of the current which excites the coil will be a ratio of fixed value.

By a primary magnetic force field is meant herein a field of that vector magnetic quantity which is referred to as magnetic force or magnetic intensity, and which is commonly identified by the symbol H. As is known, if such magnetic force field pervades a medium, the force field will create therein a primary field of a vector magnetic quantity which is referred to as magnetic induction, and which is commonly identified by the symbol B. For an isotropic paramagnetic medium, the relation at any point in the medium between B and H is that B equals H multiplied by the permeability of the medium.

When a conductivity measurement is to be made, the transmitter coil is disposed in field coupled relation with the medium adjacent a region thereof wherein the conductivity of the medium is of interest. In that circumstance, when the transmitter coil is excited by a current variation, the resulting primary field H will pervade the medium to create therein the described primary inductive field B. As a result, the medium will electrically react upon the coil as follows.

First, the impedance presented to an exciting current variation by the transmitter coil will be an impedance which will vary with the self-inductance manifested by the coil. Such self-inductance depends to an extent upon the point to point strength in the vicinity of the transmitter coil of the primary inductive field B which is created in the medium by the primary magnetic force field H. As previously indicated, at any point in the medium the ratio between the strength of the primary B field and the strength of the primary H field will vary in accordance with the permeability of the medium. Therefore, the self-inductance of the coil will, to an extent, be affected by and vary with the permeability of the medium, and the coil impedance seen by the exciting current variation will likewise be affected by and vary with the permeability of the medium.

Second, the creation of an inductive field B in the medium will serve to produce transient eddy currents therein. The electrical effect of the eddy currents on the transmitter coil can be considered as roughly equivalent to the effect on such coil of currents which are developed in a secondary coil to flow in a circuit comprised of the secondary coil and of a resistor connected between the end terminals of the secondary coil. Such currents will generate in the vicinity of the transmitter coil a secondary inductive field B which opposes the primary inductive field B created by the primary magnetic force field H from the transmitter coil. The difference at any point between the field strengths of the primary and secondary inductive fields is the field strength at that point of the net inductive field. In the instance where both a primary inductive field and an opposing secondary inductive field are present in the vicinity of the transmitter coil, the apparent inductance of the transmitter coil will vary directly with the strength at such vicinity of the net inductive field. The strength of the net inductive field will vary oppositely to the strength of the secondary inductive field which varies directly with the strength of the eddy currents. The impedance presented to the exciting current will, of course, vary in the same way as the mentioned inductance. Therefore, it is the case that eddy currents created in the medium by the action of the transmitter coil will be reflected in changes in the apparent impedance presented by the transmitter coil to a current variation which excites the coil.

To summarize the above, the apparent impedance presented by a transmitter coil to a variation of current which excites it is an impedance whose value depends at least in part upon the permeability of the medium, and upon the degree to which eddy currents are produced therein. This being so, if the apparent impedance presented by the transmitter coil to an exciting current variation is a significant factor in determining the instantaneous value of current which flows through the coil during such variation, the waveform of the current variation will vary in instantaneous magnitude value and overall configuration from one conductivity measurement to another because of differences encountered at different locations in the permeability of the medium, and in the strength of eddy currents produced therein.

The invention herein may be practiced in some of its aspects whether or not variations in the apparent impedance of the transmitter coil affect the waveform of a current variation exciting the coil. However, if the instantaneous value of the current exciting the transmitter coil is allowed to be partly dependent, as described, upon the character of the medium to which the coil is coupled, an element of uncertainty is often introduced in respect to the meaning of the readings which are obtained. Therefore, it is preferable, according to the invention, to excite the transmitter coil with a current variation or variations which have a "constant current characteristic" in the sense that the instantaneous values of the waveform of the current will be relatively unaffected by changes in the apparent impedance presented by the coil to the current. A current variation of such constant current characteristic may be obtained by employing a current waveform generating means having an actual or effective impedance many times greater than the effectual impedance of the transmitter coil. With proper proportioning of the impedance of the generating means relative to the greatest effectual impedance expected to be manifested by the coil, the instantaneous value of the current exciting the coil can be rendered independent of the effectual coil impedance to an extent whereby any changes actually occurring in current value, due to changes in effectual coil impedance, will be current changes of such minor magnitude that they can be assumed as non-existent without the introduction by such assumption of any significant error into the measurements. The employment in the invention of the feature of a constant current characteristic for the exciting current is thus a feature which does away with any need for considering the electrical effect of the medium on the transmitter coil as a factor affecting the results which are obtained.

Another advantage in exciting the transmitter coil by one or more current variations of constant current characteristic is that, as explained hereinafter, when the current variations have such characteristic, the permeability of the probed medium may, to a first approximation, be eliminated as an extraneous factor affecting the indication of conductivity which is obtained at the receiving end of the system.

The net inductive field B which is created in the medium is detected at a distance from the transmitter coil by a magnetic field receiver which may be comprised of one or more coils, wires, or other inductors adapted to have a voltage induced therein by such field. One form of such receiving means which is suitable for many applications is a single multi-turn coil, and the invention will hereinafter be described in terms of such single coil. If no eddy currents were to be developed in the medium, the excitation of the transmitter coil by a current variation of ramp waveform would cause induction in the receiving coil of a voltage having a step waveform in the sense that the voltage will undergo an abrupt rise from zero value at the start of the current waveform, and will then as abruptly flatten out to remain at a final constant value for the rest of the duration of the current waveform.

When, however, the excitation of the transmitter coil causes eddy currents to be generated in the medium the effect of such eddy currents on the voltage induced in the receiving coil will be to change the rise in magnitude of such voltage from an abrupt or substantially instantaneous rise to a delayed and more gradual rise. This delayed rise takes place over an interval of time which is short but readily measurable in most instances. Because the eddy currents are in the nature of transients, the eddy currents are most pronounced in their delaying effect on the induced voltage rise at the beginning of such rise. Thereafter, the delay effect of the eddy currents dies away. Meanwhile, the current variation of ramp waveform continues to excite the transmitter coil. The result in the receiver coil is that the rising induced voltage approaches and may attain the final constant value which, as described, such voltage would assume in the absence of any eddy currents.

Because of the consideration that in many media the induced eddy currents will be erratic in amplitude and waveform behavior, the time delayed rise in the voltage induced in the receiving coil will have a time voltage characteristic which is not generally of a regular exponential form. Nonetheless, the time-voltage characteristic of the rising voltage is analogous to a regular exponential waveform in that a significant measure of the rapidity of rise of the voltage can be obtained from the related time and voltage values of one selected time-voltage point attained by the voltage along towards the end of its rise. This particular time-voltage point may be selected or defined in various ways. As one example, the point may be selected by defining it in terms of a preselected value of time, as, say, by defining it as the point attained by the induced voltage 100 millimicroseconds after the start of the voltage rise. In such instance, the significant measure of the rapidity of rise of the induced voltage is the voltage value attained thereby at that 100 millimicroseconds time value.

As another example, the significant time-voltage point may be selected by defining it in terms of a voltage value which is a preselected percentage of the final value attained by the voltage rise. Thus, the mentioned point may be defined as, say, the time-voltage point attained by the voltage rise when the voltage value thereof is 67% of its final value. In this latter instance, the significant measure of the rapidity of rise of the induced voltage is the time interval separating the time of attainment thereby of the mentioned 67% voltage value from some reference time.

It is preferable, however, according to the invention, to measure the rapidity of rise by selecting as a reference to measure the rapidity of rise by selecting as a reference point that point at which the time voltage characteristic of the induced voltage attains a predetermined specific voltage value relative to an initial value from which the voltage rise is measured. Such a reference point is provided, for example, by that point at which the voltage rise attains a magnitude of, say, 10 millivolts relative to an initial value of zero volts. With the reference point so defined, a significant measure of the rapidity of rise is provided by the interval between the time of attainment by the voltage rise of its 10 millivolt value and some given reference time. As later explained, by using a predetermined specific voltage value as a standard for measuring rapidity of rise of the induced voltage, the measurement results obtained by the present invention can be rendered results which, to a first approximation, are indicative of the conductivity of the medium without at the same time being also indicative of the permeability of the medium.

It has been discovered, in connection with the invention, that the rapidity of rise of the induced voltage will vary in value inversely as the conductivity of the medium in that region thereof which is being inductively probed. Therefore, a measure of the rapidity of rise of the induced voltage will be a measure of the conductivity of the medium in the region of interest.

Various means and methods may be employed to obtain a suitable measure of rapidity of rise. For example, in instances where the rise of the induced voltage is sufficiently slow, the voltage rise may be displayed by the electron beam trace of a cathode ray tube whose screen is calibrated to permit the reading of the time value and the voltage value of one or more selected points of the trace. In that instance the entire time-voltage characteristic of the voltage rise can be observed, and a measure of the rapidity of voltage rise can be obtained in one of the several ways outlined above. On the other hand, if the voltage rise is relatively fast so as to require, say, only 50 millimicroseconds to reach 67% of its final value, it then becomes difficult to provide a display of the voltage rise by a cathode ray tube. However, a measure of the rapidity of rise may be provided, according to the invention, by voltage comparator means and by a source of direct current voltage having a magnitude representative of a predetermined value which will be attained by the voltage induced in the receiver coil during the rise of such voltage. The comparator means is adapted in response to inputs corresponding to such reference voltage and to the induced voltage to compare the magnitudes of such inputs and to produce an output signal upon attainment by the induced voltage of the mentioned predetermined value. The time of occurrence of the output signal will be earlier or later in dependence on whether the induced voltage has a fast or slow rise, i.e., in dependence on whether the region of medium being probed has a low or high conductivity.

Following the voltage comparator means, other means may be provided according to the invention for providing an indication of the time of occurrence, relative to a reference time, of each output signal or signals from the comparator means. For example, there may be provided time measuring means which is first responsive to an actuating signal derived from the operation of the current waveform generating means to initiate an electrical signal in the nature of a timing waveform, and which is later responsive to an output signal from the comparator means to terminate the timing waveform. The duration of the timing waveform will be a measure of the time of occurrence of the output signal relative to a reference time established by the actuating signal. The mentioned actuating signal may be a trigger signal from a signal source employed in the current waveform generating means to synchronize the operation of the circuit employed to generate the one or more current variations of ramp waveform for exciting the transmitter coil. Alternatively, as later described, the mentioned actuating signal may be provided by a second magnetic field receiver and a second voltage comparator means which are similar to those previously discussed excepting that the second receiver coil is spaced closer to the transmitter than is the first. In such two-receiver apparatus, the nearer spaced receiver coil will cause production of an output signal from the associated comparator means at a time earlier than the production of the output signal from the comparator means associated with the more remotely spaced receiver coil. This earlier output signal may be used as the mentioned actuating signal.

In the instance where the transmitter coil is excited by a succession of current variations, the resulting succession of timing waveforms may be supplied to integrating means providing a time-averaged indication of the durations of such timing waveforms. Such integrating means may take the form of a condenser, electronic switch means responsive to the timing waveforms to charge the condenser at a constant rate over the durations thereof, means providing a continuous discharge path for the condenser, and suitable means for indicating the value of condenser discharge current flowing in such path.

Instead of indicating directly the value of condenser discharge current, such current may be used to provide an error signal input to a frequency adjusting circuit which is adapted to control the current waveform generating means to establish the frequency with which current variations of ramp waveform are generated thereby. The last-named circuit responds to such error signal input to adjust such frequency in accordance with the rapidity of rise time of the voltage induced in the receiver coil.

The invention described herein is capable of widespread application. For example, by immersing the transmitter coil and receiver coil in a liquid medium such as saline water, the invention may be employed to determine the conductivity of the liquid medium. Turning to solid media, the invention is of application in determining the conductivity of a body of rock or other material. Thus, for example, equipment according to the invention may be used in geophysical prospecting by disposing the equipment on the surface of the earth and by operating the equipment to measure the conductivity of the substratum, or to detect sub-surface ore bodies.

The invention may also be used as a well logging system for obtaining an indication of the variation in conductivity with depth of earth formations traversed by a borehole which is sunk into the earth in contemplation of, say, the extraction of petroleum. Such indication or "conductivity profile" which is obtained for a given borehole is of utility in that it may serve, for example, to identify the geological nature of the mentioned earth formations, or, alternatively, to establish whether or not earth formations traversed by the given borehole have a correlation with earth formations traversed by another borehole at some distance away. The invention will hereinafter be described in connection with its application as a well logging system.

For a better understanding of the invention, reference is made to the following detailed description of representative embodiments thereof, and to the accompanying drawings wherein.

Figures 1, 2A:
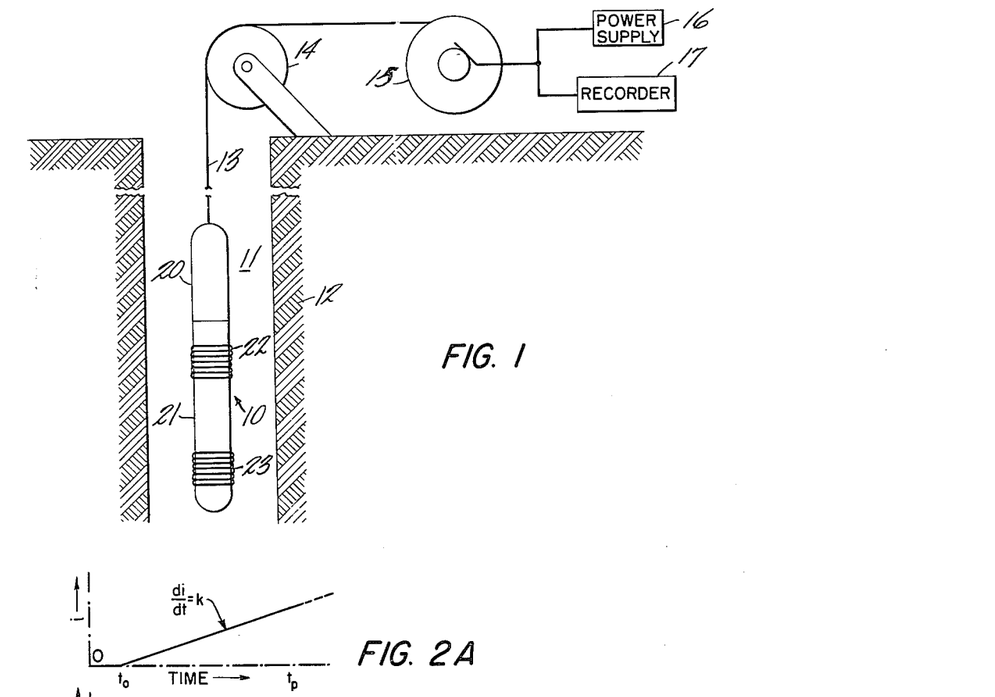
FIG. 1 is a schematic diagram of an exemplary form of well logging equipment suitable for use with apparatus according to the invention.
FIGS. 2A–2E inclusive are waveform diagrams of physical phenomena upon whic hthe operation of the invention is based.

Referring now to FIG. 1, in this figure there is shown a sonde 10 disposed in a borehole 11 traversing a medium 12 consisting of the rock material surrounding the borehole. The sonde 10 is supported from the surface of the earth by a cable 13 which passes over a pulley 14 to a winch 15 upon which the cable may be wound or unwound. Disposed within the cable are electrical conductors (not shown) which supply power from a surface power supply 16 to the sonde 10, and which carry electric signals from the sonde 10 to a recorder 17.

The sonde 10 is divided into an upper cartridge 20 and a lower mandrel 21 formed of a material which is non-conductive and non-magnetic. The cartridge 20 houses a sub-surface D.C. power supply (not shown) as well as the greater part of the apparatus which is employed in the present invention. Wound around the mandrel 21 are a multi-turn transmitter coil 22 and a multi-turn receiver coil 23 which are vertically spaced from each other. Each of the coils 22 and 23 may consist of 100 turns of wire, and may encircle an area of 100 square centimeters. The spacing between the coils may be on the order of one or two meters, although, as later explained, in some instances it is desirable to use a greater spacing as, say, a spacing on the order of 10 meters.

The transmitter coil 22 and the receiver coil 23 are employed together to obtain a conductivity measurement of the medium 12 in that region thereof which is in the vicinity of the coils. The waveform diagrams of FIGS. 2A–2E are diagrams which serve to illustrate the physical phenomena upon which the conductivity measurement is based. In all those diagrams, the same time is represented by the respective horizontal ordinates thereof, while the vertical ordinates of the diagrams represent various electrical or magnetic quantities. The diagrams are drawn to best illustrate the character of the phenomena shown thereby rather than to represent to scale the quantitative relations inhering in such phenomena.

FIG. 2A illustrates the general character of the variation in the exciting current for the transmitter coil which causes the transmitter coil to generate a time-varying magnetic field. As shown in the diagram, prior to a time $t_0$ the exciting current has a steady value as, say, a value of zero amperes. At the time $t_0$, the current starts to undergo a uni-directional change in magnitude. In FIG. 2A, the current change is in the direction of increasing magnitude, and the change is linear. Hence, from the time $t_0$ to, say, a later time $t_p$, the rate of change of the current with time will have a value $k$ which is a constant. The variation in current over the time interval $t_p-t_0$ is an example of a current variation having a ramp waveform.

The excitation of transmitter coil 22 by the current variation of FIG. 2A will cause the coil to generate a primary magnetic force field in which, at any point, the strength of the field will undergo a variation with time which duplicates the variation with time of the exciting current in the sense that, at any point in the field, the ratio in instantaneous value of the field strength to the exciting current will be a ratio which is of constant value from one instant of time to another, and which is of the same value from measurement to measurement. Accordingly, the time variation of strength of the primary magnetic force field can be considered to have a ramp waveform which is the same as the ramp waveform of the time variation of the exciting current. Such ramp waveform for field strength will be illustrated by FIG. 2A when the vertical ordinate thereof is taken to represent magnetic force H rather than current.

The H field created by the transmitter coil 22 will pervade the medium 12 in the vicinity of the coil. As earlier explained, the H field produced by the transmitter coil 22 will create in the medium a primary field of magnetic induction B having a time variation in field strength which corresponds to that of the H field. The receiver coil 23 is magnetically coupled with the inductive field B. Hence, the time variation in strength of the inductive field B will cause a voltage to be induced in the receiver coil. The instantaneous value of this voltage will be proportional to the rate of change with time of the net inductive field which acts upon the receiver coil.

In the absence of eddy currents generated in the medium 12, the only inductive field which would be present in the medium would be the primary inductive field B created by the primary magnetic force field H from the transmitter coil 22. In that instance, the time variation of the inductive field which acts upon the receiver coil would be directly proportional in instantaneous value to the time variation in magnetic force H which, in turn, is directly proportional in instantaneous value to the time variation of the exciting current. Therefore, the voltage induced in the receiver coil in accordance with the rate of change with time of the strength of inductive field acting thereon would be a component of voltage $e_1$ characterized by the step waveform shown in FIG. 2B. In this step waveform, the voltage $e_1$ at time $t_0$ jumps almost instantaneously from an initial zero value to a final value of E max., and the voltage $e_1$ then continues at this final value E max. for the remainder of the time interval during which the exciting current for the transmitter coil is changing in magnitude.

Figure 2B:
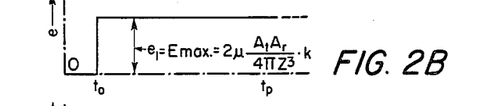

It can be shown by mathematical analysis that when, for simplification of the analysis, it is assumed that the medium 12 is a continuous homogeneous medium completely filling all the space in the vicinity of the transmitter coil and the receiver coil which is pervaded to a significant extent by the field from the transmitter coil, the final value E max. which is attained by the voltage in FIG. 2B is given in volts by the expression:

$$E \text{ max.} = 2\mu \frac{A_t A_r}{4\pi Z^3} k \qquad (1)$$

where all the factors of the expression are in MKS units, and where $A_t$ is the turns-area product for the transmitter coil; $A_r$ is the turns-area product for the receiver coil; Z is the spacing between the coil, $\mu$ is the permeability of the medium; and $k$ is the rate of change with time of the current exciting the transmitter coil.

Of course, in practice the value of E max. departs somewhat from the theoretical value given by Expression 1. This is so for the reason that, when the coils 22 and 23 are disposed in a borehole as shown in FIG. 1, the interior of the borehole occupies part of the space in the vicinity of the coils 22 and 23 which is pervaded by the magnetic field from the transmitter coil 22. Hence, there is not fully realized in practice the assumption, made in deriving Expression 1, that the medium of interest completely fills the space in the vicinity of the coils. Allowance, however, can be made for any discrepancy between the ideal and actual spatial distribution of the medium by introducing into the righthand side of the expression a multiplying constant of which the value is less than one and is determined by such dimensional factors as the diameter of the borehole. While the exact value of such constant may be determined by calculation or experiment, such exact value need not be determined in practice, since all that is required in practice is that, to a first approximation, there be a directly proportional relation between E max. and the righthand term of Expression 1, and such directly proportional relation will obtain whatever the exact value of the multiplying constant may happen to be. Therefore, in practice variations in the dimensional factors determining the mentioned multiplying constant can be largely neglected as variations affecting the measurement results.

It will be noted that in Expression 1 the quantities $A_t$, $A_r$ and Z are fixed in value by the structure of the transmitter and receiver coils and by the value selected for the spacing between those coils. Therefore, in any particular conductivity measurement the only factors which can vary are the rate of change $k$ of the current which excites the transmitter and the permeability $\mu$ of the medium. As previously described, if the effectual impedance of the transmitter coil is a significant factor in determining the instantaneous value of exciting current, such instantaneous value of exciting current will be partly dependent upon the permeability of the medium, and upon the degree to which eddy currents are induced therein.

If, however, the exciting current has a constant characteristic so that the rate of change $k$ of the current has a predetermined invariable value despite variation in the effectual impedance of the transmitter coil, then the term $k$ becomes a fixed term in Expression 1 so that the only term left variable in the righthand side of the expression is the permeability $\mu$ of the medium. Evidently, if $\mu$ is the only variable on the righthand side, the voltage value E max. will vary in directly proportional relation to the permeability of the medium being probed by the magnetic field. As later explained, use can be made of this directly proportional variation between E max. and $\mu$ when $k$ is of constant characteristic to provide a way by which the permeability of the medium can, to a first approximation, be eliminated as a factor entering into the value of the indication which is obtained for conductivity.

Figure 2C:
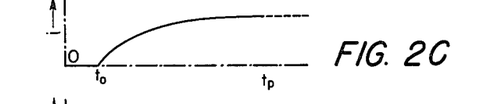
Figure 2D:
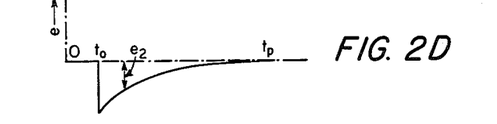

As stated, FIG. 2B represents the voltage which will be induced in receiver coil 23 in the absence of eddy currents generated in the medium 12. It happens, however, that eddy currents will be generated in such medium by the time varying magnetic field which is created in the medium by transmitter coil 22. As shown in FIG. 2C, such eddy currents will start to flow at the time $t_0$, and will, at first, rise rapidly in magnitude, but will gradually decrease their rate of rise until the eddy currents level off at a steady state magnitude value. The flow of such eddy currents in the medium 12 will create in such medium a secondary inductive field B which opposes the primary inductive field B produced in the medium by the primary magnetic force field H generated by the transmitter coil. Such secondary inductive field will act upon the receiver coil to induce therein a component of voltage $e_2$ having a waveform of which the general character is represented by FIG. 2D. As shown in that figure, the component of voltage $e_2$ is of opposite polarity to the component of voltage $e_1$ of FIG. 2B. Also, the component $e_2$ at time $t_0$ is of the same magnitude as the component $e_1$. Therefore, at time $t_0$, the net voltage $e_0$ induced in receiver coil 23 and seen as an output therefrom will be a voltage having an initial value of zero. After time $t_0$, the two components $e_1$ and $e_2$ have different time-voltage characteristics in that, as described, the component $e_1$ after time $e_0$ remains at a peak constant value, whereas the component $e_2$ after time $t_0$ gradually decays in magnitude to approach and then attain a value of zero.

Figure 2E:
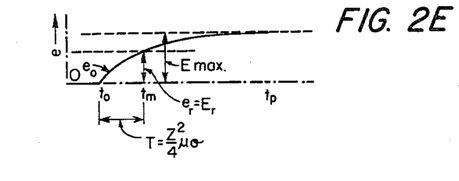

FIG. 2E represents the result in the receiver coil 23 of the super-position of the voltage components $e_1$ and $e_2$. The waveform of FIG. 2E is the waveform of the voltage $e_0$ which will actually be manifested at the output of the coil. As shown in that figure, the effect of the eddy current generated in the medium upon the net induced voltage $e_0$ is to change the rise thereof from the instantaneous rise at time $t_0$ which characterizes the waveform of FIG. 2B to the delayed and gradual rise represented by the waveform of FIG. 2E. This voltage $e_0$ of delayed rise may be described as having a time-voltage characteristic which starts at time $t_0$ to diverge from an initial value of zero volts, and which in the course of so diverging approaches the final magnitude E max. of the component $e_1$ in FIG 2B. In the waveform diagrams which are shown, the duration of the current variation of ramp waveform (FIG. 2A) is sufficiently long to permit the receiver output voltage $e_0$ to attain and remain at this final value E max. for a period of time occurring towards the end of the duration of the current variation.

The rapidity of rise of the induced voltage of FIG. 2E can be measured in terms of a time constant. One such convenient time constant is the time period T required after the time point $t_0$ for the induced voltage $e_0$ to rise to a reference voltage $e_r$ which is 67% of E max. If desired, however, other reference voltage values may be used to define the time constant, as, say, the voltage value which is 75% of E max. Also, as later explained, the time period required for the voltage to reach a selected value may be measured relative to some starting or reference point in time which is other than $t_0$.

Again assuming the condition that the medium 12 is a homogeneous medium occupying all the space in the vicinity of coils 22 and 23 which is penetrated to a significant extent by the magnetic field transmitter coil 22, it can be shown by mathematical analysis that the time constant T as defined above is given by the expression:

$$T = \frac{Z^2}{4}\mu\sigma \qquad (2)$$

where all quantities in the expression are in MKS units, and where the new quantity $\sigma$ represents the conductivity of the medium. The expression establishes the theoretical value for T in terms of the spacing Z between the coils, the permeability μ of the medium and the conductivity σ thereof. In practice the following additional factors affect T. First, as mentioned previously, in the logging of boreholes the medium does not completely fulfill the condition assumed in deriving Expression 2 that the medium occupy all the space in the vicinity of the coils 22 and 23 which is pervaded to a significant degree by the magnetic field from the transmitter coil. Second, although FIGS. 2C-2E show the transient phenomena associated with the eddy currents as having regular exponential waveforms, in borehole practice such waveforms will commonly depart somewhat from regular exponential curves. Both such factors can be accounted for in Expression 2 by introducing into the righthand side of the expression a multiplying constant having a value which is less than one, and which value may be determined by calculation or experiment. It is not essential, however, to determine the exact value of such multiplying constant since all that is required in practice is that, to a first approximation, there be a directly proportional relation between the left and righthand sides of Expression 2, and such proportional relation will be obtained, whatever the value of the multiplying constant may work out in practice to be. Therefore, the effect of variations in the mentioned additional factors upon the value of T can largely be neglected.

In well logging measurements the range of conductivity of the medium which is ordinarily of interest is from 1 to 1000 millimhos per meter. If the spacing Z between the coils 22 and 23 is 2 meters, and assuming a permeability μ having a value of $4\pi \times 10^{-7}$ (the permeability of free space), if σ is one millimho, the time constant T will have a value of about 1.2 millimicroseconds, whereas, if σ is 1000 millimhos, T will have a value of about 1200 millimicroseconds. As indicated by the figures just given, the value of the time constant T will vary directly as the conductivity of the medium. The same would also be true of other time constants which can be selected as appropriate measures of the rapidity of rise of the induced voltage $e_0$. It is this phenomenon of a variation in the same sense between the conductivity of the medium and a factor expressing the rapidity of rise of the induced voltage $e_0$ which is the phenomenon upon which the present invention is based. The selection of the particular time constant T as such factor is a particularly suitable selection since, as indicated in Expression 2, in theory the value of the time constant T will have an exact linear relation with the value of the conductivity of the medium. All of the later described embodiments take advantage of this linear relation between T and σ to obtain an indication of the conductivity of the medium.

Before passing on to a description of such embodiments there are some further points of interest in connection with Expression 2. First, it will be noted that the value of T will vary as the square of the spacing Z between the coils 22 and 23. Therefore, by increasing such spacing from, say, 2 meters to, say, 10 meters, with all other factors affecting T remaining the same, the time period represented by T will be lengthened 25-fold. Of course, such increase in the spacing between the coils will decrease the sharpness of resolution with which the coil combination can provide a conductivity profile of the various earth formations successively traversed by the borehole. As a compensating advantage, however, an increase in the vertical spacing of the coils results in an increase in the horizontal distance from the borehole to which the medium surrounding the borehole may be probed for conductivity. Moreover, the lengthening out of the time period T as the square of the coil spacing Z can be of considerable advantage when the region of medium to be probed has a low value for its conductivity σ as, say, a value of 1 millimho per meter. If, as set out above, such conductivity value of 1 millimho is typified by a resulting time period for T of 1.2 millimicroseconds when the spacing Z between the coils 22 and 23 is 2 meters, then such conductivity value of one millimho will be typified by a resulting time period for T of 30 millimicroseconds when the spacing Z is 10 meters, and of course the latter time period is much easier to measure accurately by electronic techniques than is the former.

Second, it will be noted from Expression 2 that while T will vary in direct proportion to the conductivity σ of the medium, it will also vary in direct proportion to the permeability μ of the medium. Therefore, it would seem that when T is used to provide a quantitative indication of the conductivity σ of the medium, such indication would inevitably reflect in its value the permeability μ of the medium and would vary in value in accordance therewith. I have discovered, however, that, to a first approximation, variations in the permeability μ of the medium can be precluded from causing variations in the value of T, whereby T can be used to provide a measure of the conductivity σ of the medium which is unaffected by variations in permeability. This result may be realized as follows.

As defined heretofore, T represents the time period required for the induced voltage $e_0$ (FIG. 2E) to reach a reference voltage $e_r$ equal to 67% of E max., the final value of voltage approached by $e_0$. This definition of T implies, however, the requirement that the value of the permeability μ of the medium be known or determined beforehand, since as previously pointed out, E max. varies with μ and accordingly a reference voltage $e_r$ which is 67% of E max. will also vary with μ. The previously given definition of T also implies the requirement that, as variations in permeability are encountered in the medium, the value of $e_r$ in volts be reset from time to time in order to assure that, in the presence of such μ variations, the value of $e_r$ will at all times be equal to 67% of E max. which varies with μ.

While such requirements may not be unduly burdensome in instances of the obtaining of conductivity profiles of boreholes where the permeability of the medium surrounding the borehole is previously well known and does not vary much over the borehole length, it is evident, at the same time, that it would be desirable to dispense with such requirements. I have found that this may be done by presupposing as a value for μ some specific value μ1 which is representative on the average of the conductivity of rock media encountered, and by defining the time constant T of interest as that particular time period Δt which is required for the induced voltage $e_0$ to reach the value $E_r$ of reference voltage $e_r$ which obtains when $e_r$ as before is defined as, say, 67% of E max., but when E max. is fixed in value in Expression 1 by setting μ equal to μ1 with the other factors $A_t$, $A_r$, Z and k being of predetermined value. In such definition the reference voltage value $E_r$ will be of a fixed predetermined value in volts since the value of $E_r$ is determined by a fixed preselected value μ1 for permeability. This fixed value in volts for $E_r$ contrasts with the variable value in volts of the reference voltage $e_r$ as previously used in the definition of the time constant T.

Let there now be considered the effect on the time constant Δt of a variation in the actual permeability μ of the medium under the circumstance where the conductivity σ of the medium remains constant. Thus, let it be assumed, for example, that the permeability μ changes from a value of μ1 to a value of 2μ1. In that instance if the current variation exciting the transmitter coil is of constant current characteristic so that the rate of change k of the current remains constant despite a change in the effectual impedance of the transmitter coil resulting from the change in permeability of the medium, then from expression 1 it will be seen that the value for μ E max. when μ equals 2μ1 will be twice the value of E max. when μ equals μ1. In other words, when k remains constant, the effect of a doubling of the permeability value of the medium is to double the final voltage level E max. towards which the induced voltage $e_0$ in FIG. 2E is rising. Likewise, if the rapidity of rise of the induced voltage is defined as in Expression 2 as the period T required after time $t_0$ for the induced voltage to attain a reference voltage value $e_r$ which is 67% of E max., the voltage $e_r$ to which the time constant T is referred will be changed from a value $E_r$ at $\mu$ equals $\mu 1$ to the doubled value of $2E_r$ when $\mu$ equals $2\mu 1$.

If the only effect of the doubling of the permeability of the medium were to be to double the value of the reference voltage $e_r$ from $E_r$ to $2E_r$, the time period $\Delta t$ required for the induced voltage $e_0$ to reach the voltage level $E_r$ when $\mu$ equals $2\mu 1$ would be roughly half the period $\Delta t$ required for the voltage $e_0$ to reach voltage level $E_r$ when $\mu$ equals $\mu 1$. Thus, if such were the only effect, the change in permeability of the medium would make a very substantial change in the value of the time constant $\Delta t$. However, the doubling of the permeability of the medium has another effect which, as indicated in Expression 2, is to double the time constant T. To state it another way, when $\mu$ is changed from $\mu 1$ to $2\mu 1$ to thereby change from $E_r$ to $2E_r$ the value of the voltage $e_r$ to which the time constant T is referred, the value of the time constant T is also doubled so that it takes the rising voltage $e_0$ twice as long to reach the voltage level $2E_r$ to which the time constant T is now referred as it did to reach the voltage $E_r$ to which the time constant T was referred when $\mu$ equaled $\mu 1$. Therefore, because of this lengthening effect on the time constant T, as $\mu$ is changed from $\mu 1$ to $2\mu 1$, the time $\Delta t$ required for the induced voltage $e_0$ to reach the reference voltage level $E_r$ will not be cut roughly in half in the presence of such change in permeability, but instead will, to a first approximation, remain the same although such change in permeability takes place. Accordingly, changes in permeability will not, to a first approximation, be reflected in the value of $\Delta t$, and $\Delta t$ will, to a first approximation, fluctuate in accordance with only the variations in the conductivity of the medium.

The above explanation has, for convenience, made some simplifying assumptions such as that permeability $\mu$ of the medium changes from an average value of $\mu 1$ to a twice average value of $2\mu 1$. Ordinarily, the variation in $\mu$ will not be so great. The explanation shows, however, that the respective effects of a change in permeability of the medium upon the time constant T and upon the voltage $e_r$ to which the time constant T is referred are effects which, under a particular combination of conditions, will offset each other to thereby render an obtained indication of conductivity of the medium quantitatively unaffected, to a first approximation, by variations in permeability of the medium over a range of variations thereof from a standardized value of permeability. This is true for variations in the permeability of the medium below the standardized value $\mu 1$ as well as for variations above such standardized value. As indicated by the explanation, the combination of conditions required to take place is that the current variation exciting the transmitter coil 22 shall be of constant current characteristic to render the factor $k$ in Expression 1 of constant value despite variations produced in the effectual impedance of the transmitter coil due to changes in the character of the surrounding medium, and that the time constant by which the rapidity of rise of the induced voltage $e_0$ in the receiver coil is measured is that time constant which has heretofore been identified by $\Delta t$, and which is the duration of the period required after a reference time for the induced voltage $e_0$ to rise to a reference voltage value $E_r$ which has a predetermined value in volts and which is, therefore, independent in value of variations in the final voltage E max. approached by the rising induced voltage $e_0$.

In the foregoing description, the sonde 10 has been considered as being stationarily positioned within the borehole 11. It will be understood, however, that, in well logging practice, the sonde 10 is moved continuously or step by step by the cable 13 to obtain conductivity measurements of the medium 12 surrounding the borehole at different vertical positions. From a series of these measurements there may be constructed a conductivity profile for the borehole.

Figure 3:
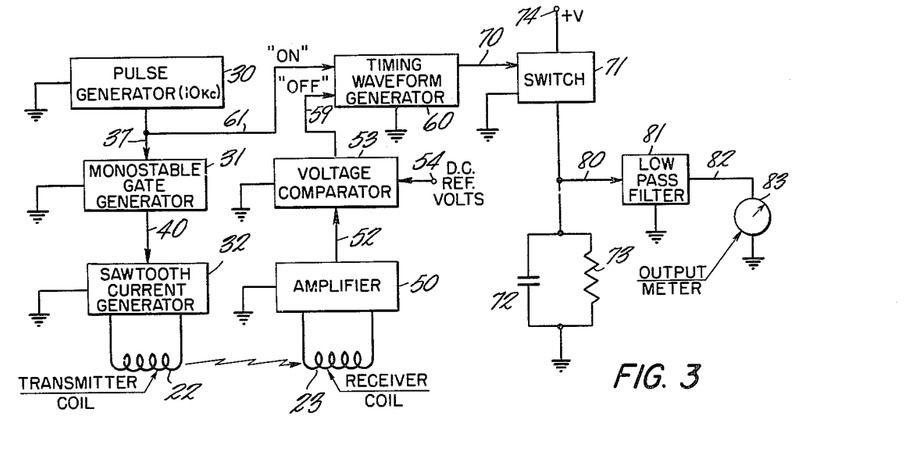
FIG. 3 is a block diagram of an embodiment of apparatus according to the invention.

The phenomena illustrated in FIGS. 2A–2E are utilized to obtain conductivity measurements by apparatus whose circuit layout is shown in block diagram in FIG. 3, and whose operation is illustrated by the waveform diagrams in FIGS. 4A–4G. The last-named waveform diagrams illustrate one cycle of operation of the apparatus. In all of the waveform diagrams, the same time is represented by the respective horizontal ordinates thereof, whereas the vertical ordinates of the various diagrams represent various electrical quantities. The diagrams 4A–4G are not drawn to exact scale but are drawn to best illustrate the significant features of the waveforms represented thereby.

Figure 4A:
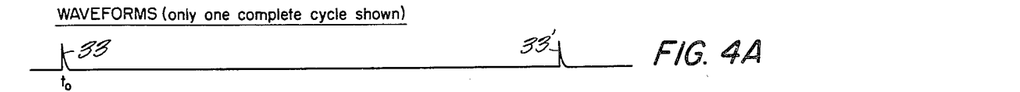
FIGS. 4A–4G inclusive are waveform diagrams of electric signal quantities produced in the course of operation of the FIG. 1 embodiment.

In the apparatus shown in FIG. 3, the transmitter coil 22 is excited with current from current waveform generating means consisting of a pulse generator circuit 30, a monostable gate generator circuit 31, and a sawtooth current generator circuit 32. The pulse generator circuit 30 acts as a source of trigger pulses of which two pulses 33 and 33' are shown in FIG. 4A, and of which the pulse 33 is generated at the time $t_0$ marking the beginning of a cycle. The trigger pulses may have a frequency of recurrence of 10 kilocycles, whereby a 100 microsecond time interval will elapse between the generation of each pulse and the generation of the succeeding pulse.

Figure 4B:
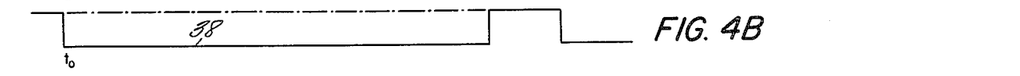

The trigger pulses from the pulse generator circuit 30 are supplied by a lead 37 to the monostable gate generator circuit 31 which may be a monostable multivibrator, blocking oscillator or the like, and which is responsive to each trigger pulse to initiate the generation of a negative going gating signal 38 (FIG. 4B). The circuit characteristics of the monostable circuit 31 are chosen to render each gating signal 38 of lesser duration than that of the time interval separating the trigger pulse which initiated the gating signal from the next following trigger pulse.

Each gating signal 38 is supplied by a lead 40 to the sawtooth generating circuit 32. The sawtooth circuit 32 is of a sort which is adapted in response to a negative going gating signal and over the duration thereof to generate a current variation 41 (FIG. 4C) which is of ramp waveform in the sense that the current constituting the variation undergoes a linear rise in magnitude from an initial value of zero. Upon termination of the gating signal 38, the current rise generated by circuit 32 also terminates, and the output current reverts to a value of zero during a "fly back" period which is completed before the generation of the trigger pulse next following the pulse which initiated the current rise.

The circuit 32 thus generates a sawtooth wave of current in response to the generation of each trigger pulse by the circuit 30. Since the circuit 30 generates a continuous succession of trigger pulses at, say, a ten kilocycle frequency of recurrence, the circuit 32 will likewise generate a continuous succession of sawtooth waves of current at such frequency of recurrence. The successive current sawtooths which are so generated are supplied to the transmitter coil 22 which responds to the linearly rising leading edge 41 of each sawtooth to produce the time variation in magnetic field strength which has been discussed.

The sawtooth circuit 32 is of a type adapted to provide output current variations which are of constant current characteristic in the sense that the instantaneous value of such current variations will not be significantly effected by variations in the effectual impedance of the load to which the output current is supplied, such load in this instance being the transmitter coil 22. As is known, in order to obtain such constant current characteristic, it is a requirement that the actual or effective impedance of the current generator be much greater than the effectual impedance of the load supplied thereby. Consonant with this requirement, in the apparatus of FIG. 3 the sawtooth circuit 32 is characterized in operation by an impedance sufficiently greater than that of the transmitter coil 22 to render the instantaneous values of the current variation 41 independent for practical measuring purposes of variations which take place in the effectual impedance of transmitter coil 22.

Figures 4C, 4D, 4E:
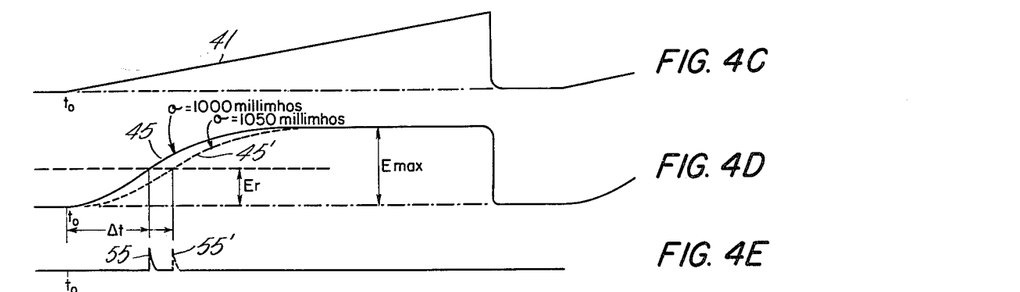

As heretofore described, the receiver coil 23 responds to the time variations in magnetic field strength created by the transmitter coil 22 to manifest an induced voltage (FIG. 4D) which rises in magnitude from an initial value of zero volts to approach a final steady-state value of E max. In the described apparatus E max. may be a value of 20 millivolts when the spacing between the coils 22 and 23 is 2 meters. In the mode of operation for the FIG. 3 apparatus which is represented by the discussed waveform diagrams, the duration of the current variation 41 (FIG. 4C) is sufficiently long to permit the induced voltage (FIG. 4D) to attain such final value E max. and to remain at such final value for a period preceding the termination of the linearly rising current variation. As shown in FIGS. 4C and 4D, when the current variation 41 terminates, there is a return to zero value of the voltage induced in the receiver coil.

As earlier explained, the rapidity of rise of the induced voltage will vary inversely with the conductivity of the medium 12 (FIG. 1) in the region thereof to which the coils 22 and 23 are inductively coupled. This inverse relationship is shown in FIG. 4D wherein the solid line 45 represents the time-voltage characteristic of the voltage induced in the receiver coil in the presence of a medium having a conductivity of 1000 millimhos, and wherein the dotted line 45' represents the time-voltage characteristic of such induced voltage in the presence of a medium having a conductivity of 1050 millimhos. It will be noted that the rise of the curve 45' obtained for the higher 1050 millimho value is more gradual than that of the curve 45 obtained for the lower 1000 millimho value.

The difference in rapidity of rise between the curves 45 and 45' is manifested by the different times at which those curves respectively intersect the voltage level $E_r$ which is 67% of E max. when the latter voltage value is determined by taking some standardized value $\mu 1$ for the permeability of the medium. As is evident, the time period $\Delta t$ required after the reference time $t_0$ for the induced voltage to attain the level $E_r$ will be a time period which will vary directly with the conductivity $\sigma$ of the medium.

The pulse of voltage (FIG. 4D) which is induced in receiver coil 23 is supplied to the input of a plural stage amplifier 50. This input is of sufficiently high impedance to limit the flow of current in the receiver coil to a negligible value. In this way, the receiver coil 23 will be essentially an open circuit coil, and will therefore have no reactive effects upon the magnetic fields which induce the voltage pulse in the coil. The bandwidth of the amplifier 50 from input to output is made sufficiently wide to amplify without distortion the range of significant frequency components represented by the rising edge of the induced voltage pulse. Since those frequency components occupy an extensive frequency range, the amplifier 50 is a broad band amplifier.

The amplified voltage pulse from the amplifier 50 is supplied by a lead 52 as an input to a voltage comparator circuit 53 which receives another input in the form of a direct current reference voltage supplied from a source 54. The direct current reference voltage is representative of the voltage value $E_r$ (FIG. 4D) in that the direct current voltage equals $E_r$ multiplied by the gain factor between the input and the output of amplifier 50. Thus, at any time the magnitude of the amplified voltage pulse received by comparator circuit 53 will have the same proportional relation to the magnitude of the direct current voltage received thereby as the magnitude of the voltage induced in the receiver coil will have to the voltage value $E_r$ (FIG. 4D). It follows that, in the comparator circuit 53, the input of the amplified induced voltage will attain coincidence in value with the input of D.C. reference voltage at the same time as in FIG. 4D the voltage originally induced in the receiver coil reaches coincidence in value with the reference voltage value $E_r$.

The time at which such coincidence in voltage value occurs in the comparator circuit 53 is indicated by an output signal developed by that circuit. This output signal is in the form of a short electrical pulse whose timing depends on the rapidity of rise of the induced voltage. Thus, as shown in FIG. 4E, the timing pulse developed by the comparator circuit 53 will have the positions in time which are represented by the solid line pulse 55 and the dotted line pulse 55' when the rapidity of rise of the induced voltage follows respectively the curve 45 and the curve 45' in FIG. 4D.

To the end of developing this timing pulse, the comparator circuit 53 may be comprised of the elements (not shown) of a rectifier device which is reversely biased by the direct current reference voltage, and of a resistor which is connected to the rectifier to apply the amplified induced voltage thereto with a polarity urging flow of current through the rectifier in the forward direction. The timing pulse is produced in the form of a voltage drop developed across the resistor at the time when the applied voltage first exceeds the direct current voltage to overcome the reverse bias on the rectifier, and to thereby initiate a flow of current in the forward direction through the rectifier and the resistor.

Figure 4F:
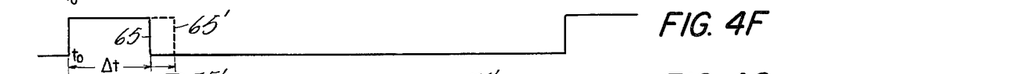

The output pulse from voltage comparator circuit 53 is supplied by a lead 59 as an input to a timing waveform generator circuit 60 which may be, for example, a bistable multivibrator (i.e., "flip-flop") or a monostable multivibrator whose free-running "on" period exceeds in duration the maximum value of $\Delta t$ which would be encountered in practice. The timing waveform circuit 60 also receives by a lead 61 another input in the form of a trigger pulse developed by pulse generator circuit 30. As shown by FIGS. 4A and 4F, each trigger pulse actuates the circuit 60 to initiate the generation of an output signal which may be, say, of square waveform. This output signal of square waveform continues until terminated by the pulse from comparator circuit 53 which immediately follows upon the trigger pulse initiating the output signal. As shown by FIG. 4F, the square wave output from the timing waveform circuit 60 will be terminated as indicated by the solid lines 65 and the dotted lines 65' when the timing pulse from the comparator circuit 53 has the respective positions in time which are represented (FIG. 4E) by the solid line pulse 55 and the dotted line pulse 55'.

It will be recognized that the square wave output of FIG. 4F will have a duration of $\Delta t$ as that time period has been heretofore defined. Accordingly, since $\Delta t$ is proportional to the conductivity $\sigma$ of the region of the medium 12 which is probed by the transmitter coil 22, the duration of the square wave output will be a proportional electrical indication of the value of $\sigma$.

It has been found, however, that rather than determining the duration of each individual square wave output produced by the timing waveform circuit 60, it is convenient and preferable to obtain an indication of the average duration of a succession of such outputs occurring over a time period which is long compared to the duration of each such output. This time-averaged indication is obtained by supplying the square wave outputs from circuit 60 by a lead 70 to an electronic switch 71 forming an element of electrical integrating means of which other elements are a condenser 72 and a resistor 73 connected in parallel with the condenser. The electronic switch 71 is interposed between the condenser-resistor combination and a source 74 of charging current for the condenser.

Figure 4G:
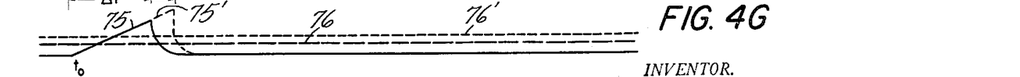

The switch 71 is adapted in response to each square wave signal from circuit 60 to change from an "off" state to an "on" state to permit the charging of the condenser 72 for the duration of the square wave signal by current flowing at a constant rate from source 74 through switch 71 to the condenser. One suitable electrical circuit element providing such switch is a constant current pentode connected to receive the square wave signal on its control electrode, and adapted to be changed from a nonconducting to a conducting condition by such square wave signal. The charging of the condenser in response to the first of a succession of square wave signals is represented in FIG. 4G wherein the solid line 75 and the dotted line 75' represent the increase in voltage across the condenser when the square wave signals from circuit 60 have the respective durations which are represented by the solid line 65 and by the dotted line 65' in FIG. 4F. The condenser 72 undergoes charging for only a minor fraction of the time interval between trigger pulse 33 and trigger pulse 33' (FIG. 4A). During the remaining fraction of this interval the condenser 72 discharges through the resistor 73. The current flowing through the discharge path provided by this resistor will vary in value directly as the time interval during which the condenser 72 has been charged at a constant rate. Thus, the discharge current will have the values represented by the dotted line 76 and by the dotted line 76' (FIG. 4G) when the condenser 72 has previously been charged over many cycles at a constant rate for the respective durations which are indicated by the increasing voltage line 75 and the increasing voltage line 75'.

The description has hitherto been largely confined to the effect of the first square wave output received from circuit 60 by switch 71 upon the charging and discharging of the condenser 72. When however, a number of square wave signals are received in succession by the switch 71, the total charge accumulated by condenser 72 will be progressively built up by each increment of charge received by the condenser as a result of a separate actuation of the switch 71. This progressive building up of the charge on condenser 72 will continue at a decreasing rate until there is reached a condition of equilibrium where the charge gained by the condenser during each charging period is just equal to the charge lost from the condenser through the resistor 73 in the interval which intervenes before the next charging period. For this equilibrium condition, the voltage across resistor 73 will be essentially a steady state D.C. voltage having a value which is directly proportional to the average duration over a long time period of the successive square wave signals which actuate the switch 71. Therefore, the value of the voltage across resistor 73 will, to a first approximation, be directly proportional to the conductivity $\sigma$ of the medium 12, and will hence be an electrical indication providing a measure of such conductivity.

A time-averaged indication of the sort just described is characterized by the following advantages among others as compared to the indication of conductivity which is provided by the duration of each individual square wave output (FIG. 4F) which is generated by the timing waveform circuit 60. First, where the duration $\Delta t$ of such square wave output is rather short, as, say, on the order of 50 millimicroseconds, it is easier, as a matter of electronic measuring techniques, to obtain an accurate indication of conductivity from the D.C. voltage developed across resistor 73 than from a direct indication of the duration of an individual square wave output. Second, if over a number of cycles of operation of the described apparatus, a few of the induced voltage pulses become "lost" due to anomalous non-functioning of the apparatus, the effect of such loss on the time-averaged indication will be negligible, since the lost pulses will be greatly outnumbered by the pulses actually produced. Third, the described technique of integrating the effects of a long succession of square wave outputs to obtain a time-averaged indication is a technique which serves to improve the signal-to-noise ratio of the measurement results. This is so, because any random variations occurring in the duration of the square wave outputs will be variations which will, over a long time period, tend to cancel each other out insofar as they affect the value of the time-averaged indication which is obtained.

The voltage indication developed across resistor 73 is supplied by a lead 80, a low pass filter 81 and a lead 82 to an instrument 83 which may be a recording or an indicating instrument, and which forms part of the recorder 17 (FIG. 1). The instrument may be made to indicate absolute values of conductivity by observing the amount of deflections or other indicating actions produced in the instrument when the described equipment is operated in the presence of media of different known absolute conductivity valves, and by calibrating the instrument accordingly.

All of the various circuits which are represented in block diagram in FIG. 3 may be circuits which are conventionally used in nuclear physics to measure short time intervals. The circuits shown in block diagram together with condenser 72 and resistor 73 are all disposed within the cartridge 20 (FIG. 1) of the sonde 10. Of course, the coils 22 and 23 are not disposed within the cartridge. Also, the instrument 83 is not within the cartridge, but is located at the surface of the ground.

In the apparatus which has been described, the voltage induced in the receiver coil as a result of current pulsing of the transmitter coil will be a voltage which is free of any extraneous background component tending to mask a component of the induced voltage which represents the conductivity of the medium. As another advantage, the measurements of conductivity of a medium obtained by the described apparatus will not be extraneously affected by skin effect phenomena produced in the medium. As yet another advantage, by exciting the transmitter coil with current in a pulsed manner rather than in a continuous manner, a given amount of average power can be utilized to provide a much higher amount of peak power for the time intervals in which the transmitter coil is pulsed. This concentration of continuous average power into intermittent periods of much higher peak power is a technique which increases the value of voltage induced in the receiver coil for a given spacing between the transmitter and receiving coils, or, alternatively, permits a desired value of induced voltage to be obtained in the receiver coil with a greater spacing between the transmitter and receiver coils.

Figure 5:
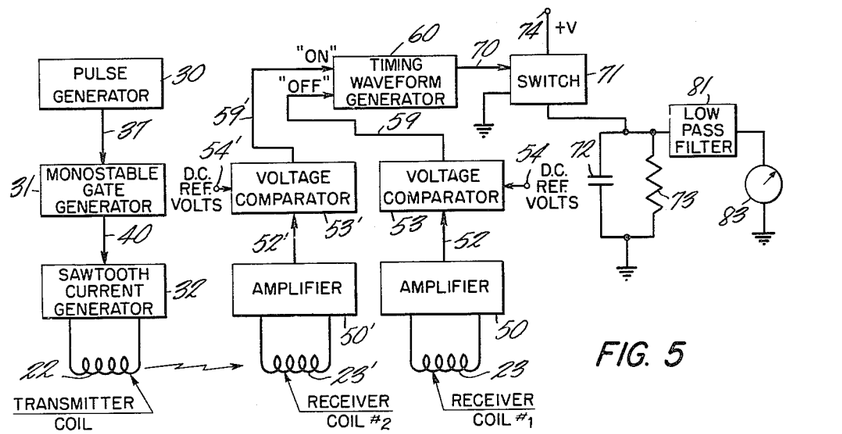
FIG. 5 is a block diagram of the FIG. 1 embodiment as modified to include two receivers.

FIG. 5 shows the FIG. 3 embodiment as modified to include a second receiver coil 23', a second amplifier 50', and a second voltage comparator circuit 53'. The receiver coil 23' is wound on the mandrel 21 (FIG. 1) to be spaced away from the transmitter coil 22 in the same direction as the receiver coil 23, but to be spaced closer to transmitter coil 22 than is the receiver coil 23. Otherwise, the signal channel comprised of elements 23', 50' and 53' is similar to the signal channel comprised of elements 23, 50 and 53.

In the FIG. 5 modification, because of the closer spacing of receiver coil 23' to transmitter coil 22 than the spacing of receiver coil 23 to that transmitter coil, the comparator circuit 53' will develop an output timing pulse sooner than will the comparator circuit 53. This earlier pulse from the comparator circuit 53' is employed in the FIG. 5 modification as the actuating signal which is fed to the timing waveform generator circuit 60 to cause such circuit to initiate a square wave output. Thus, in the FIG. 5 modification the output pulse from comparator circuit 53' performs the actuating function which is performed in the FIG. 1 embodiment by a trigger pulse supplied from the pulse generator circuit 30 to the circuit 60. It follows that in the FIG. 5 modification the duration $\Delta t$ of the square wave output from the circuit 60 will be the time period required for the voltage induced in the receiver coil 23 to reach the reference value $E_r$ after a reference time established by the time of occurrence of the output pulse from comparator circuit 53′.

The advantage in the two-receiver modification shown in FIG. 5 is that it permits conductivity measurements to be made with greater resolution than would be obtainable with the one-receiver apparatus shown in FIG. 3. The reason for the greater resolution is that in the two-receiver apparatus the spacing Z between coils which determines the resolution has, in effect, been reduced from the spacing between a transmitter coil and one receiver coil to the spacing between the two receiver coils.

Figure 6:
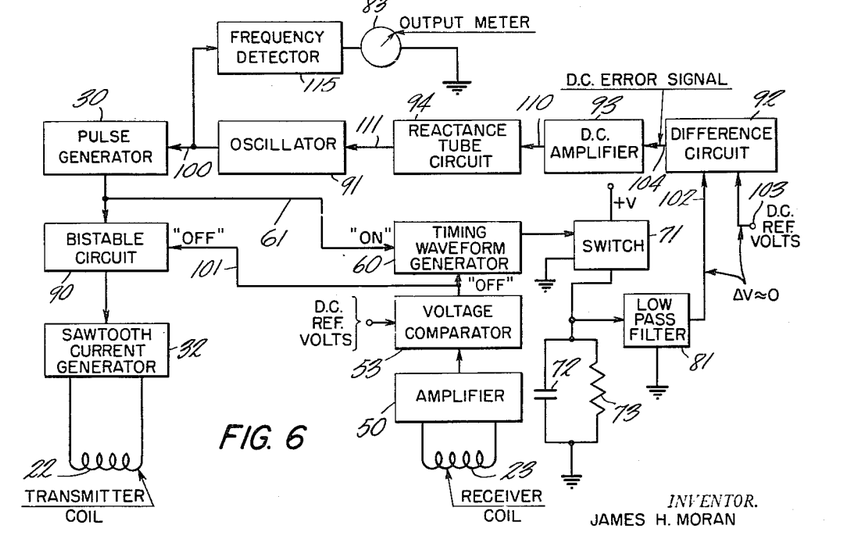
FIG. 6 is a block diagram of the FIG. 1 embodiment as modified to include a frequency control channel.

FIG. 6 shows a modification of the FIG. 3 embodiment in which, among other changes, the monostable gate generator 31 of FIG. 3 has been replaced by a bistable multivibrator or other bistable circuit 90, the frequency of recurrence of the trigger pulses produced by the pulse generator circuit 30 of FIG. 3 is locked to the frequency of oscillation of an adjustable frequency oscillator 91, and the oscillation frequency of the oscillator 91 is adjusted by a frequency control channel consisting of a difference circuit 92, a D.C. amplifier 93 and a reactance tube circuit 94. The FIG. 6 modification can best be described in terms of its operation which is as follows.

The oscillator circuit 91 produces a sinusoidal output signal having a frequency which is a function of the capacitance effective in the circuit. This sinusoidal output of the oscillator is fed by a lead 100 to the pulse generator circuit 30 which, by a wave shaping action, converts the positive half cycles of the oscillator output into the trigger pulses which have previously been described. Each such trigger pulse is fed to the bistable circuit 90 to cause such circuit to initiate a negative going gating signal in a manner alike to the initiation of the gating signal produced by the monostable circuit 31 of FIG. 3. As another resemblance to FIG. 3, in the FIG. 6 apparatus each trigger pulse from the circuit 30 is fed via conductor 61 to the timing waveform circuit to cause the initiation thereby of an output signal of square waveform. As a difference, however, in FIG. 6 the timing pulse generated by comparator circuit 53 is supplied not only to the timing waveform circuit 60, but as well (by the lead 101) to the bistable circuit 90. This timing pulse input to circuit 90 serves to instantaneously terminate the negative going gating signal which is then being generated by that circuit. Accordingly, each gating signal generated by circuit 90 and each resulting current variation 41 generated by the sawtooth circuit 32 will be characterized by the duration $\Delta t$ when such duration is taken in relation to the reference time $t_0$.

In the FIG. 6 modification, the D.C. output voltage from filter 81 is not as in FIG. 3 directly supplied to an indicating or recording instrument, but is, instead, supplied by the lead 102 as an input to the difference circuit 92. This difference circuit also receives from a voltage source 103 a second input in the form of a D.C. reference voltage. The difference circuit 92 responds to the two input signals received thereby to produce as an output on a lead 104 a D.C. error signal whose polarity and magnitude corresponds to the difference in polarity and magnitude between the D.C. voltage received by the circuit 92 from filter 81 and the D.C. reference voltage received by that circuit from the source 103.

The error signal on lead 104 is amplified by the D.C. amplifier 93 and is then fed by the lead 110 to the reactance tube circuit 94. The reactance tube circuit 94 is coupled by lead 111 to oscillator circuit 91 to vary the capacitance which determines the frequency of oscillation of circuit 91 in accordance with variations in value in the error signal received by the reactance tube circuit. If the voltage supplied by lead 102 to difference circuit 92 departs in value from the reference voltage supplied to that circuit from source 103, the frequency of oscillation of the oscillator circuit 91 is adjusted in a direction tending to bring the voltage on lead 102 back into equality with the D.C. reference voltage from source 103.

The operating characteristics of the FIG. 6 system are selected to cause the cycles of oscillation of the oscillator 91 to have a period of $2\Delta t$ under the condition where the error signal on lead 104 is of zero value and where accordingly the system is stabilized. While the system is so stabilized, an indication of the value of the frequency of oscillation of the circuit 91 is obtained by a frequency detector circuit 115 which responds to the sinusoidal output signal from oscillator circuit 91 to develop a D.C. voltage which varies directly as the frequency of the sinusoidal signal. This output voltage actuates the indicating or recording instrument 83 which is common to the FIG. 6 system and to the FIG. 3 system.

The overall operation of the FIG. 6 system may be explained as follows. If, as described, each square wave signal from the timing waveform circuit 60 has a duration of $\Delta t$, and if, as further described, the oscillator circuit 91 is adjusted to render equal to $2\Delta t$ the period between successive trigger pulses generated by the circuit 30, then, over a time period which is long as compared to $\Delta t$, the average charge stored by condenser 72 will be the same whatever may be the value of $\Delta t$. This feature of constancy of the average charge stored by condenser 72 represents a criterion for stability of the system. That this is so will be evident from the consideration that, if such average charge stays constant, the D.C. voltage on lead 102 will also stay constant to maintain at zero value the error signal of lead 104, when, as contemplated, the reference voltage from source 103 is adjusted to equal at that time the voltage on lead 102. Therefore, the FIG. 6 system will be self-stabilizing despite changes in the value of $\Delta t$ by virtue of the fact that, following any such change in $\Delta t$, the frequency of the oscillator circuit 91 is automatically readjusted to render the period between successive trigger pulses equal to twice the new value of $\Delta t$.

The mode by which such frequency readjustment takes place can be understood by considering what happens in the presence of an increase in $\Delta t$ from an old value to a new value. The increase in $\Delta t$ has the effect of transiently increasing the average charge stored by condenser 72. This event causes in turn a transient increase in the D.C. voltage fed by lead 102 to the difference circuit 92. The mentioned voltage increase causes the development on lead 104 of an error signal of suitable polarity to actuate the reactance tube circuit 94 in a manner causing the oscillator circuit 91 to undergo an adjustment in frequency in the direction towards that value for which the period of the oscillation cycles will be twice what is now $\Delta t$. As the oscillator frequency approaches this value, the average charge on condenser 72 will decay towards the constant level assumed by such charge when the system is stable to produce a corresponding decrease in the magnitude of the error signal. These "closed loop" actions will be continued to completion to restabilize the system in a condition where the average charge stored by condenser 72 remains constant with time, the error signal on lead 104 is of zero value, and the frequency of oscillator circuit 91 remains constant at the new value of $2\Delta t$.

In connection with the above description of the FIG. 6 system, it will be recognized that the stable frequency value provided by the oscillator circuit 91 will be a value of $\frac{1}{2}\Delta t$, and that, accordingly, such frequency value as indicated at instrument 83 will be an inverse measure rather than a direct measure of the conductivity $\sigma$. However, the indication at instrument 83 will be a direct measure of the resistivity of the medium.

It will be recognized that the above-described methods and apparatus are exemplary only, and that, accordingly, the present invention comprehends methods and apparatus which may differ in form and/or detail from those described above. For example, the monostable gate generator circuit 31 of the FIG. 3 system may be used in the FIG. 6 system in lieu of the bistable circuit 90 providing that the negative going gate signal developed by the circuit 31 is of lesser duration than 2Δt for the smallest value of Δt encountered in practice. If such substitution of circuit 31 for circuit 90 is made, the lead 101 becomes superfluous and is eliminated. Moreover, if desired, the FIG. 6 system may be modified to include the second signal channel of the elements 23', 50' and 53' which is shown in FIG. 5. As a part of such modification, the lead 61 in the FIG. 6 system is eliminated, and the timing pulse from the comparator circuit 53' is employed (as described in connection with FIG. 5) as the actuating signal which initiates the generation by the timing waveform circuit 60 in the FIG. 6 system of a square wave output signal.

Accordingly, the invention herein is not to be considered as limited save as is consonant with the scope of the following claims.

I claim:

1. Apparatus for measuring the conductivity of a medium having a randomly varying magnetic permeability comprising, means including a transmitter inductor disposed in said medium for establishing in said medium a magnetic field having a strength which varies from an initial value to a final value at a rate which remains substantially constant for all values of permeability, a receiver inductor disposed in inductive relationship with said field and spaced from said transmitter inductor, and means coupled to said receiver inductor for electrically sensing when the voltage induced in said receiver inductor attains a predetermined absolute value, said predetermined value being the same for a range of values of permeability, whereby the effect of said randomly varying permeability on the accuracy of the measurement is rendered negligible.

2. Apparatus as in claim 1 in which said magnetic field establishing means comprises a source of periodic trigger signals, a gate generator circuit responsive to each trigger signal to generate a gating signal, and a high impedance, sawtooth generating circuit responsive to each gating signal to produce a sawtooth current having a constant current characteristic and changing linearly over the initial part of the sawtooth, and means coupling said sawtooth generating circuit to said transmitter inductor.

3. Apparatus for measuring the conductivity of a medium pervadable by magnetic fields comprising, current generator means adapted to produce at least one current variation having a constant current characteristic and a ramp waveform, field transmitting means adapted in response to said current variation to produce in said medium a time variation of primary magnetic force field of like ramp waveform, field receiving means spaced in operation from said transmitting means and adapted in response to said field variation as manifested as an inductive field in said medium to have induced therein a time variation of voltage which has a time-voltage characteristic diverging from an initial value to attain a predetermined absolute value and then approach a final value in the course of so diverging, said predetermined value remaining the same for a range of final values of voltage, source means of a dynamically constant reference voltage having a magnitude representative of said predetermined value, voltage comparator means responsive to inputs corresponding to said reference voltage and to said induced voltage variation and adapted by comparing the relative magnitudes of said inputs to produce an output signal upon attainment by said induced voltage variation of said predetermined value, and time measuring means responsive to said output signal to produce an electric signal indication of the time of occurrence of said output signal relative to a reference time, said indication being a measure of the conductivity of said medium.

4. Apparatus as in claim 3 in which said time measuring means comprises a timing waveform generating circuit responsive to an actuating signal derived from said current waveform generating means to initiate an electric signal having a timing waveform, and responsive to said output signal from said comparator means to terminate said timing waveform, said timing waveform providing said electric signal indication.

5. Apparatus as in claim 4 in which said current waveform generator means comprises a source of periodic trigger signals and a current waveform generating circuit synchronously responsive to each trigger pulse to generate a current variation having said ramp waveform, said apparatus further comprising means to supply each trigger signal as said actuating signal to said time measuring means.

6. Apparatus for measuring the conductivity of a medium pervadable by magnetic fields comprising, high impedance current waveform generator means adapted to produce at least one current variation having a constant current characteristic and a ramp waveform, low-impedance field transmitting means adapted in response to said current variation to produce in said medium a time variation of primary magnetic force field of like ramp waveform, field receiving means spaced in operation from said transmitting means and adapted in response to said field variation as manifested as an inductive field in said medium to have induced therein a time variation of voltage which has a time-voltage characteristic diverging from an initial value to attain a predetermined absolute value and then approach a final value in the course of so diverging, said predetermined value remaining the same for a range of final values of voltage, source means of a dynamically constant reference voltage representative in magnitude of said predetermined value voltage comparator means responsive to inputs corresponding to said reference voltage and to said induced voltage variation and adapted by comparing the relative magnitudes of said inputs to produce an output signal upon attainment by said induced voltage variation of said predetermined value, and time measuring means responsive to an actuating signal initiated by said generator means and then responsive to said output signal from said comparator means to produce an electric signal indication of the elapsed time between said actuating signal and output signal, said indication being a measure of the conductivity of said medium.

7. Apparatus for measuring the conductivity of a medium pervadable by magnetic fields comprising, current waveform generator means adapted to produce successive current variations each having a constant current charactertistic and a ramp waveform, field transmitting means adapted in response to said current variations to produce in said medium successive time variations of primary magnetic force field of like ramp waveform, field receiving means adapted in response to said field variations as manifested as an inductive field in said medium to have induced therein successive time variations of voltage of which each voltage variation has a time-voltage characteristic diverging from an initial voltage value to attain a predetermined absolute value and then approach a final voltage in the course of so diverging, said predetermined value remaining the same for a range of final values of voltage, source means of a dynamically constant reference voltage representative in magnitude of said predetermined value, voltage comparator means responsive to inputs corresponding to said reference voltage and to said induced voltage variations and adapted by comparing the relative magnitudes of said inputs to produce an output signal upon attainment by each induced voltage variation of said predetermined value, time measuring means responsive to an actuating signal initiated by said generator means and then responsive to an output signal from said comparator means to produce successive electric signal indications of the elapsed time between each actuating signal and the following output signal, and signal integrating means cumulatively responsive to said successive indications to produce a time averaged indication of said elapsed time.

8. Apparatus as in claim 7 in which said generator means comprises a source of periodic trigger signals and a current waveform generating circuit synchronously responsive to said trigger signals to produce the said current variations of ramp waveform, said time measuring means comprises a timing waveform generating circuit responsive to each trigger signal as said actuating signal to initiate a square timing waveform and responsive to each output signal from said comparator means to terminate said timing waveform, and said integrating means comprises condenser means, means responsive to each timing waveform to charge said condenser at a constant rate over the duration of said timing waveform, means to furnish a discharge path for said condenser means, and means to provide an output representative of the value of condenser discharge current flowing in said path.

9. Apparatus for measuring the conductivity of a medium pervadable by magnetic fields comprising, high impedance current waveform generator means adapted to produce successive current variations each having a constant current characteristic and a ramp waveform, field transmitting means adapted in response to said current variations to produce in said medium successive time variations of primary magnetic force of like ramp waveform, field receiving means adapted in response to said field variations as manifested as an inductive field in said medium to have induced therein successive time variations of voltage of which each voltage variation has a time-voltage characteristic diverging from an initial voltage value to attain a predetermined absolute value and then approach a final value in the course of so diverging, said predetermined value remaining the same for a range of final values of voltage, source means of a dynamically constant reference voltage representative in magnitude of said predetermined value, voltage comparator means responsive to respective inputs corresponding to said reference voltage and to each of said induced voltage variations and adapted by comparing the relative magnitudes of said inputs to produce an output signal upon attainment by each induced voltage variation of said predetermined value, time measuring means responsive to actuating signals initiated by said generator means and to the output signals from said comparator means to produce successive electric signal indications of the elapsed time between each actuating signal and the following output signal, and signal integrating means cumulatively responsive to said successive indications to produce a time-averaged indication of said elapsed time.

10. Apparatus for measuring the conductivity of a medium pervadable by magnetic fields comprising, a source of periodic trigger signals, a high impedance current waveform generating circuit synchronously responsive to said trigger signals to produce successive current variations of constant current characteristic and each having a ramp waveform, at least one low-impedance field-transmitting inductor adapted in respone to said current variations to produce in said medium successive time variations of primary magnetic force field of like ramp waveform, a field receiving inductor spaced in operation from said transmitter inductor and adapted in response to said field variations as manifested as an inductive field in said medium to have induced therein successive time variations of voltage of which each has a time-voltage characteristic diverging from an initial zero value to pass through a predetermined absolute value and then approach a final value in the course of so diverging, said predetermined value remaining the same for a range of final values of voltage, broad band means to amplify said induced voltage variations, a source of a dynamically constant reference voltage of a magnitude representative of said predetermined value, a voltage comparator circuit responsive to said reference voltage and to said amplified voltage variations to produce an output signal upon the attainment by each amplified variation of the magnitude of said reference voltage, and a time measuring circuit responsive to the trigger signals from said source and to the output signals from said comparator circuit to provide successive electrical indications of the successive time intervals which individually occur between each trigger signal and the following output signal, said indications being a measure of the conductivity of said medium.

11. Apparatus for measuring the conductivity of a medium pervadable by magnetic fields comprising, a source of periodic trigger signals, a high impedance current waveform generating circuit synchronously responsive to said trigger signals to produce successive current variations of constant current characteristic and each having a ramp waveform, at least one low-impedance field-transmitting inductor adapted in response to said current variations to produce in said medium time variations of primary magnetic force field of like ramp waveform, a field receiving inductor spaced from said transmitter inductor and adapted in response to said field variations as manifested as an inductive field in said medium to have induced therein successive time variations of voltage of which each has a time-voltage characteristic diverging from an initial zero value to pass through a predetermined absolute value and then approach a final constant value in the course of so diverging, broad band means to amplify said induced voltage variations, a source of a dynamically constant reference voltage of a magnitude representative of said predetermined value, a voltage comparator circuit responsive to said reference voltage and to said amplified voltage variations to produce an output signal upon the attainment by each amplified variation of the magnitude of said reference voltage, said receiver inductor, broad band amplifier means and voltage comparator comprising a first signal channel, a second signal channel similar to said first channel but having the receiver inductor thereof spaced closer than that of said first channel to said transmitter inductor to thereby lead said first channel in producing output signals, and a time measuring circuit responsive to the output signals from both channels to provide successive electric signal indications of the successive time intervals which individually occur between each second channel output signal and the following output signal from said first channel, said indications being a measure of the conductivity of said medium.

12. Apparatus for measuring the conductivity of a medium pervadable by magnetic fields comprising, a source of periodic trigger signals, a high impedance current waveform generating circuit synchronously responsive to said trigger signals to produce successive current variations of constant current characteristic and each having a ramp waveform, at least one low-impedance field-transmitting inductor adapted in response to said current variations to produce in said medium successive time variations of primary magnetic force field of like ramp waveform, a field receiving inductor spaced from said transmitter inductor and adapted in response to said field variations as manifested as an inductive field in said medium to have induced therein successive time variations of voltage of which each has a time-voltage characteristic diverging from an initial zero value to pass through a predetermined absolute value and then approach a final value in the course of so diverging, said predetermined value remaining the same for a range of final values of voltage, broad band means to amplify said induced voltage variations, a source of a dynamically constant reference voltage of a magnitude representative of said predetermined value, a voltage comparator circuit responsive to said reference voltage and to said amplified voltage variations to produce an output signal upon the attainment by each amplified variation of the magnitude of said reference voltage, a time measuring circuit responsive to said trigger signals from said source and to said output signals from said comparator circuit to produce successive timing waveforms which are each initiated by a trigger signal and then terminated by the following output signal, and means to integrate the durations of said timing waveforms to obtain a time-averaged indication of the durations thereof.

13. Apparatus for measuring the conductivity of a medium pervadable by magnetic fields comprising, a source of periodic trigger signals, a high impedance current waveform generating circuit synchronously responsive to said trigger signals to produce successive current variations of constant current characteristic and each having a ramp waveform, at least one low-impedance field-transmitting inductor adapted in response to said current variations to produce in said medium successive time variations of primary magnetic force field in said medium, a field receiving inductor spaced from said transmitter inductor and adapted in response to said field variations as manifested as an inductive field in said medium to have induced therein successive time variations of voltage of which each has a time-voltage characteristic diverging from an initial zero value to pass through a predetermined absolute value and then approach a final constant value in the course of so diverging, broad band means to amplify said induced voltage variations, a source of a dynamically constant reference voltage of a magnitude representative of said predetermined value, a voltage comparator circuit responsive to said reference voltage and to said amplified voltage variations to produce an output signal upon the attainment by each amplified variation of the magnitude of said reference voltage, said receiver inductor, broad band amplifier means and voltage comparator comprising a first signal channel, a second signal channel similar to said first channel but having the receiver inductor thereof spaced closer than that of said first channel to thereby lead said first channel in producing output signals to said transmitter inductor, a time measuring circuit responsive to the output signals from both channels to produce successive timing waveforms which are each initiated by a second channel output signal and are then terminated by the following output signal from said first channel, and means to integrate the durations of said timing waveforms to obtain a time-averaged indication of the durations thereof.

14. Apparatus for measuring the conductivity of a medium pervadable by magnetic fields comprising, current waveform generator means adapted to produce successive current variations each having a ramp waveform, field transmitting means adapted in response to said current variations to produce in said medium successive time variations of primary magnetic force field of like ramp waveform, field receiving means adapted in response to said field variations as manifested as an inductive field in said medium to have induced therein successive time variations of voltage of which each voltage variation has a time-voltage characteristic diverging from an initial voltage value to approach a final constant voltage in the course of so diverging, source means of reference voltage, voltage comparator means responsive to inputs corresponding to said reference voltage and to said induced voltage variations and adapted by comparing the relative magnitudes of said inputs to produce an output signal upon attainment by each individual voltage variation of said predetermined value, means responsive to said output signals to control said generator means to adjust the frequency of recurrence of said current variations as a function of the tme of occurrence of each output signal relative to a reference time, and means to provide an indication of the said frequency of recurrence, said indication being a measure of the conductivity of said medium.

15. Apparatus for measuring the conductivity of a medium pervadable by magnetic fields comprising, a source of periodic trigger signals, a high impedance current waveform generating circuit synchronously responsive to said trigger signals to produce successive current variations of constant current characteristic and each having a ramp waveform, at least one low-impedance field-transmitting inductor adapted in response to said current variations to produce in said medium successive time variations of primary magnetic force field of like ramp waveform, a field receiving inductor spaced from said transmitter inductor and adapted in response to said field variations as manifested as an inductive field in said medium to have induced therein successive time variations of voltage of which each has a time-voltage characteristic diverging from an initial zero value to pass through a predetermined value and then approach a final constant value in the course of so diverging, broad band means to amplify said induced voltage variations, a source of direct current reference voltage of a magnitude representative of said predetermined value, a voltage comparator circuit responsive to said reference voltage and to said amplified voltage variations to produce an output signal upon the attainment by each amplified variation of the magnitude of said reference voltage, a time measuring circuit responsive to said trigger signals from said source and to said output signals from said comparator circuit to produce successive timing waveforms which are each initiated by a trigger signal and then terminated by the following output signal, means responsive to said timing waveforms to produce an error signal representative in value of a time-averaged indication of the fraction of the intervals between trigger pulses which are occupied by the durations of said timing waveforms, means responsive to said error signal to control said trigger signal source to adjust the frequency of recurrence of said trigger signals to produce time intervals therebetween which are twice the durations of said timing waveforms, and means to provide an indication of the said frequency of recurrence, said indication being a measure of the conductivity of said medium.

16. Apparatus for measuring the conductivity of a medium pervadable by magnetic fields comprising current generator means adapted to produce at least one current variation having a ramp waveform, field transmitting means adapted in response to said current variation to produce in said medium a time variation of primary magnetic force field of like ramp waveform, field receiving means spaced in operation from said transmitting means and adapted in response to said field variation as manifested as an inductive field in said medium to have induced therein a time variation of voltage which has a time-voltage characteristic diverging from an initial value to attain a predetermined absolute value and then approach a final constant value in the course of so deverging, source means of a dynamically constant reference voltage having a magnitude representative of said predetermined value, voltage comparator means responsive to inputs corresponding to said reference voltage and to said induced voltage variation and adapted by comparing the relative magnitudes of said inputs to produce an output signal upon attainment by said induced voltage variation of said predetermined value, said field receiving means and voltage comparator means comprising a first signal channel, said apparatus further comprising a second signal channel similar to said first channel but having the field receiving means thereof spaced closer than that of said first channel to said field transmitting means to thereby produce an output signal earlier than said first channel, and time measuring means including a timing waveform generating circuit responsive to an actuating signal derived from said second signal channel to initiate an electrical signal having a timing waveform, and responsive to said output signal from said first signal channel to terminate said timing waveform, said timing waveform providing a measure of the conductivity of said medium.

17. Apparatus for measuring the conductivity of a medium pervadable by magnetic fields comprising, current waveform generator means adapted to produce successive current variations each having a ramp waveform, field transmitting means adapted in response to said current variations to produce in said medium successive time variations of primary magnetic force field of like ramp waveform, field receiving means adapted in response to said field variations as manifested as an inductive field in said medium to have induced therein successive time variations of voltage of which each voltage variation has a time-voltage characteristic diverging from an initial voltage value to attain a predetermined absolute value and then approach a final constant voltage in the course of so diverging, source means of reference voltage, voltage comparator means responsive to inputs corresponding to said reference voltage and to said induced voltage variations and adapted by comparing the relative magnitudes of said inputs to produce an output signal upon attainment by each induced voltage variation of said predetermined value, said field receiving means and voltage comparator comprising a first signal channel, a second signal channel similar to said first signal channel but having the field receiving means thereof spaced closer than that of said first channel to said field transmitting means to thereby produce said output signals earlier than said first channel, time measuring means including a timing waveform generating circuit responsive to each second channel output signal to initiate a timing waveform and responsive to each following output signal from said first channel to terminate said timing waveform, integrating means comprising condenser means, means responsive to each timing waveform to charge said condenser means at a constant rate for the duration of said timing waveform, means providing a discharge path for said condenser means, and means to provide an output representative of the value of condenser discharge current flowing in said path, said signal integrating means cumulatively responsive to said successive indications to produce a time average indication of said elapsed time.

18. A magnetic induction method for measuring the conductivity of a medium having a randomly variable magnetic permeability comprising the steps of, establishing in said medium a magnetic field having a strength which varies from an initial value to a final value at a rate which remains substantially constant for all values of permeability, detecting the voltage induced in a receiver inductor disposed in said field, and electrically sensing when said induced voltage attains a predetermined absolute voltage value, said predetermined value being the same for a range of values of permeability.

References Cited in the file of this patent
UNITED STATES PATENTS

| | | |
|---|---|---|
| 2,190,322 | Potapenko | Feb. 13, 1940 |
| 2,190,324 | Peterson | Feb. 13, 1940 |
| 2,200,096 | Rosaire et al. | May 7, 1940 |
| 2,527,559 | Lindblad et al. | Oct. 31, 1950 |
| 2,568,241 | Martin | Sept. 18, 1951 |
| 2,576,339 | Gray | Nov. 27, 1951 |
| 2,601,492 | Baker | June 24, 1952 |
| 2,661,421 | Talamini | Dec. 1, 1953 |
| 2,712,630 | Doll | July 5, 1955 |
| 2,768,701 | Summers | Oct. 30, 1956 |
| 2,781,970 | Kaufman | Feb. 19, 1957 |
| 2,840,806 | Bateman | June 24, 1958 |
| 2,865,564 | Kaiser et al. | Dec. 23, 1958 |
| 2,897,486 | Alexander et al. | July 28, 1959 |
| 2,928,039 | Huddleston | Mar. 8, 1960 |
| 2,941,196 | Raynsford et al. | June 14, 1960 |